United States Patent
Lee

(10) Patent No.: US 10,974,588 B2
(45) Date of Patent: Apr. 13, 2021

(54) SYSTEM AND METHOD FOR CONTROLLING ACTIVE AIR FLAP OF VEHICLE

(71) Applicants: Hyundai Motor Company, Seoul (KR); Kia Motors Corporation, Seoul (KR)

(72) Inventor: Jang Hyo Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 51 days.

(21) Appl. No.: 16/359,573

(22) Filed: Mar. 20, 2019

(65) Prior Publication Data

US 2020/0171936 A1 Jun. 4, 2020

(30) Foreign Application Priority Data

Nov. 30, 2018 (KR) .................. 10-2018-0152740

(51) Int. Cl.
  *B60K 11/08* (2006.01)
  *B60K 11/06* (2006.01)
  *B60R 19/52* (2006.01)
(52) U.S. Cl.
  CPC ............ *B60K 11/085* (2013.01); *B60K 11/06* (2013.01); *B60R 2019/525* (2013.01); *B60Y 2306/05* (2013.01); *B60Y 2400/302* (2013.01)
(58) Field of Classification Search
  CPC ........ B60K 11/04; B60K 11/08; B60K 11/085
  See application file for complete search history.

(56) References Cited

U.S. PATENT DOCUMENTS

| | | | | |
|---|---|---|---|---|
| 6,354,096 B1* | 3/2002 | Siler | .................. | F01P 7/048 |
| | | | | 236/35.3 |
| 9,050,885 B1* | 6/2015 | Dudar | .................. | B60K 15/03 |
| 9,523,305 B2* | 12/2016 | Nam | .................. | F01P 5/02 |
| 9,580,071 B2* | 2/2017 | Asami | .................. | B60W 10/08 |
| 9,604,533 B2* | 3/2017 | Itoh | .................. | B60W 20/00 |
| 9,670,824 B2* | 6/2017 | Sowards | .................. | F01P 7/12 |
| 9,701,174 B2* | 7/2017 | Yoshimi | .................. | B60K 11/085 |
| 9,726,067 B2* | 8/2017 | Hakeem | .................. | F01M 13/00 |
| 9,770,974 B2* | 9/2017 | Asano | .................. | B60K 11/085 |
| 9,776,616 B2* | 10/2017 | Itoh | .................. | B60W 20/18 |
| 9,827,845 B2* | 11/2017 | Miyaji | .................. | F01P 7/12 |

(Continued)

FOREIGN PATENT DOCUMENTS

KR  2018-0114411 A  10/2018

*Primary Examiner* — Jeffrey J Restifo
(74) *Attorney, Agent, or Firm* — Mintz Levin Cohn Ferris Glovsky and Popeo, P.C.; Peter F. Corless

(57) ABSTRACT

A method for controlling an active air flap of a vehicle is provided. The method includes receiving individual amounts of cooling demand required by a plurality of apparatuses requiring cooling that are installed within an engine room. Demand duties are then calculated based on the amounts of cooling demand required by the respective apparatuses and correction duties for the respective apparatuses are calculated by multiplying the demand duties for the respective apparatuses by an outside temperature factor according to the outside temperature of the vehicle. A maximum value out of the correction duties for the respective apparatuses is selected as a final duty and the active air flap is operated with an opening degree based on the selected final duty.

13 Claims, 3 Drawing Sheets

(56) References Cited

U.S. PATENT DOCUMENTS

| | | | |
|---|---|---|---|
| 9,878,609 B2* | 1/2018 | Dudar | F01P 7/02 |
| 9,909,486 B2* | 3/2018 | Murata | F02B 63/04 |
| 9,950,612 B2* | 4/2018 | Miller | F01P 7/12 |
| 9,975,421 B2* | 5/2018 | Froling | B60K 11/085 |
| 10,060,329 B2* | 8/2018 | Murata | B60L 1/02 |
| 10,071,595 B2* | 9/2018 | Hasegawa | B60B 7/0086 |
| 10,344,854 B2* | 7/2019 | Ogawa | B60W 10/30 |
| 10,350,990 B2* | 7/2019 | Moro | F01P 11/10 |
| 10,363,811 B2* | 7/2019 | Klop | B60H 1/242 |
| 10,364,735 B2* | 7/2019 | Macfarlane | B60K 11/085 |
| 10,434,868 B2* | 10/2019 | Nishioka | B60K 11/085 |
| 10,457,137 B2* | 10/2019 | Matsumura | F01P 7/12 |
| 10,464,412 B2* | 11/2019 | Dudar | B60K 11/085 |
| 10,471,966 B2* | 11/2019 | Dudar | B60W 50/04 |
| 10,549,625 B2* | 2/2020 | Woo | B60K 11/085 |
| 10,556,494 B2* | 2/2020 | Nagaosa | B60K 13/04 |
| 10,584,652 B2* | 3/2020 | Kelly | F02B 33/40 |
| 10,611,235 B2* | 4/2020 | Sakashita | B60K 11/06 |
| 10,612,450 B2* | 4/2020 | Nishioka | F01P 7/06 |
| 10,618,002 B2* | 4/2020 | Fingland | B62D 35/007 |
| 10,618,402 B2* | 4/2020 | Komatsubara | F24F 13/14 |
| 10,697,351 B2* | 6/2020 | Jolk | F01P 11/20 |
| 2006/0095178 A1* | 5/2006 | Guilfoyle | B60K 11/085 |
| | | | 701/36 |
| 2011/0288717 A1* | 11/2011 | Yu | B60K 11/085 |
| | | | 701/31.4 |
| 2016/0237884 A1* | 8/2016 | Yamada | F02B 37/186 |
| 2016/0368366 A1* | 12/2016 | Miller | B60K 11/085 |
| 2017/0120743 A1* | 5/2017 | Dudar | B60K 11/085 |
| 2018/0312039 A1* | 11/2018 | Sakane | F01P 7/10 |
| 2018/0361846 A1* | 12/2018 | Dudar | B60K 11/085 |

* cited by examiner

SYSTEM AND METHOD FOR CONTROLLING ACTIVE AIR FLAP OF VEHICLE

CROSS REFERENCE TO RELATED APPLICATION

The present application claims priority of Korean Patent Application No. 10-2018-0152740 filed on Nov. 30, 2018, the entire contents of which is incorporated herein for all purposes by this reference.

BACKGROUND

Field of the Disclosure

The present disclosure relates to a technology for controlling an active air flap (AAF) of a vehicle, and more particularly, to a system and method for controlling an AAF that optimize cooling performance within the vehicle.

Description of the Related Art

An active air flap is generally installed between a radiator grille and a radiator at the front of a vehicle to be able to open and close. Accordingly, the amount of driving wind or air of the vehicle flowing into the radiator is capable of being adjusted. When the active air flap is opened, the driving air flows into an engine room as well as the radiator thus improving cooling performance of various components therein. When the active air flap is closed, air resistance of the vehicle is reduced, thereby contributing to improvement of fuel efficiency of the vehicle.

Recently, vehicles are being equipped with various apparatuses that requiring cooling, including an engine as well as cooling equipment such as an air conditioner, power electric (PE) components such as electric motors and inverters and the like. Such apparatuses requiring cooling also require different amounts of cooling demand and different time points of cooling. In addition, effects of increasing the cooling performance by the driving wind that is introduced into the engine room due to opening of the active air flap are also different in the respective apparatuses requiring cooling.

However, in the prior art, when the temperature of any specific apparatus requiring cooling, such as an engine, is determined to be high, opening of the active air flap is performed without consideration of cooling demand of the other apparatuses requiring cooling. As a result, excessive cooling as a whole occurs as well as an increase of air resistance of the vehicle, thereby reducing fuel efficiency of the vehicle.

The above information disclosed in this section is merely to enhance the understanding of the background of the disclosure and therefore it must not be taken as an admission that it corresponds to the prior art well known to those who have ordinary skill in the art.

SUMMARY

The present disclosure to provides a method for controlling an active air flap of a vehicle, which provides optimal cooling performance for different cooling demands of various apparatuses within the vehicle requiring cooling and maximizes the effect of reducing air resistance of the vehicle by the active air flap thus contributing to the improvement of the vehicle fuel efficiency.

In one aspect of the present disclosure a method for controlling an active air flap of a vehicle may include: receiving, by a controller, individual amounts of cooling demand required by a plurality of apparatuses that are installed within an engine room of the vehicle; calculating, by the controller, demand duties based on the amounts of cooling demand required by the respective apparatuses; calculating, by the controller, correction duties for the respective apparatuses by multiplying the demand duties for the respective apparatuses by an outside temperature factor based on the outside temperature of the vehicle; selecting, by the controller, a maximum value out of the correction duties for the respective apparatuses as a final duty; and operating, by the controller, the active air flap to adjust an opening degree of the active air flap based on the selected final duty.

In particular, the controller may be configured to receive revolution per minute (RPM) of an electric water pump and RPM of a radiator fan, which are requested by respective controllers for each of the apparatuses requiring cooling, as the amounts of cooling demand Additionally, a current demand duty that corresponds to the current amount of cooling demand may be calculated as the demand duty based on a map representing demand duties corresponding to amounts of cooling demand respectively, which is provided separately for every amount of cooling demand to be calculated by requirements of the respective control units. The correction duties may be calculated by multiplying the demand duties by correction factors according to the outside air temperature, which are defined separately for every demand duty.

The present disclosure may further include considering refrigerant pressure of an air conditioner by calculating a current demand duty that corresponds to the current refrigerant pressure of the air conditioner based on a map representing demand duties that correspond to refrigerant pressures of the air conditioner respectively and then calculating correction duties by multiplying the current demand duty by temperature difference factors based on differences between the outside air temperature and a set temperature of the air conditioner. In the process of selecting a final duty, the calculated correction duties based on refrigerant pressure may be compared with the correction duties for the respective apparatuses requiring cooling and then a maximum value resulting from the comparison may be selected as the final duty. The present disclosure may further include warming an engine by operating the active air flap to close when an engine-on request is input from a full automatic temperature controller (FATC) or temperature of cooling water of the engine is equal to or less than a reference temperature set based on the outside air temperature.

According to the present disclosure, it may be possible to provide optimal cooling performance for different cooling demands of various apparatuses requiring cooling that are installed within the vehicle and also to maximize the effect of reducing air resistance of the vehicle by the active air flap thus contributing to the improvement of vehicle fuel efficiency.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present disclosure will hereinafter be described in detail with reference to the accompanying drawings, however, it is not limited to the exemplary embodiment of the present disclosure. Further, in the description of the present disclosure, the detailed description of related well-known configurations and functions is not provided, when it is determined as unnecessarily making the scope of the present disclosure unclear.

Figure 1:
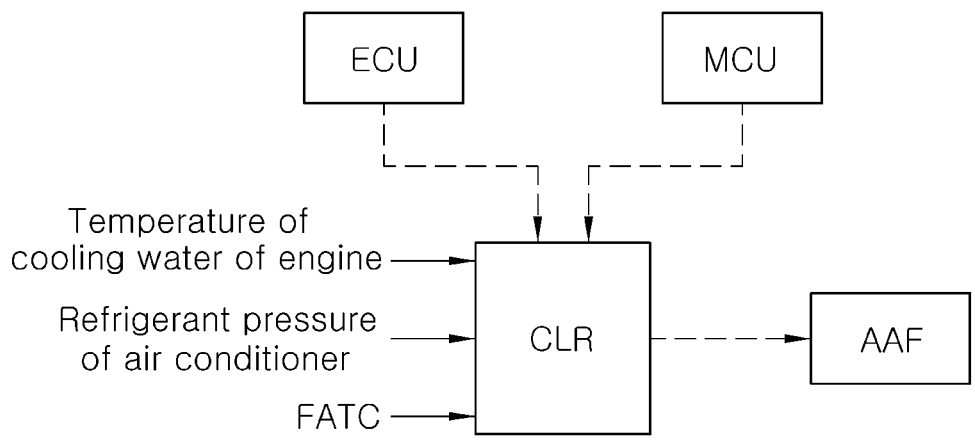
FIG. 1 is a block diagram illustrating a control system of a vehicle equipped with an active air flap according to an exemplary embodiment of the present disclosure.

Referring to FIG. 1, a controller (CLR) may be installed within the vehicle to operate an active air flap (AAF). In particular, the controller (CLR) may be configured to receive signals indicating amounts of cooling demand from an engine control unit (ECU) configured to operate an engine and a motor control unit (MCU) configured to operate electric motors, inverters and the like and additionally receive, refrigerant pressure of an air conditioner, temperature of cooling water of the engine and requests (e.g., input requests) of a full automatic temperature controller (FATC). For reference, it is noted that the term "controller" expressed simply herein means a controller configured to operate the active air flap and that in the present disclosure, as the duty control of the active air flap is possible, the active air flap may have an adjustable opening degree capable of being adjusted almost continuously based on the duty amount.

Figure 2:
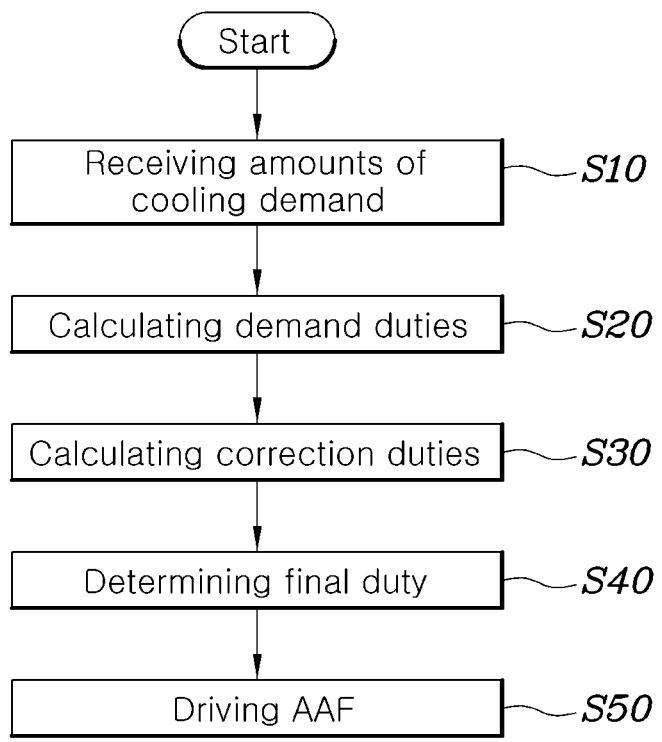
FIG. 2 is a flowchart illustrating a method for controlling an active air flap according to an exemplary embodiment of the present disclosure.

Referring to FIG. 2, a method for controlling an active air flap of a vehicle according to an exemplary embodiment of the present disclosure may include: receiving, by the controller (CLR), individual amounts of cooling demand required by a plurality of apparatuses requiring cooling that are installed within an engine room of the vehicle in step S10; calculating, by the controller, demand duties based on the amounts of cooling demand required by the respective apparatuses in step S20; calculating, by the controller, correction duties for the respective apparatuses by multiplying the demand duties for the respective apparatuses by an outside temperature factor based on the outside temperature of the vehicle in step S30; selecting, by the controller, a maximum value out of the correction duties for the respective apparatuses as a final duty in step S40; and operating, by the controller, the active air flap to have an opening degree adjusted based on the selected final duty in step S50.

In other words, in this exemplary embodiment of the present disclosure, the demand duties and correction duties for the amounts of cooling demand required by each of the plurality of apparatuses requiring cooling, may be calculated sequentially and the opening degree of the active air flap may be adjusted based on the final duty that is the maximum value out of the correction duties. Accordingly, it may be possible to establish the opening degree of the active air flap that is suitable for the maximum amount of cooling demand out of the plural amounts of cooling demand.

The opening degree of the active air flap that is suitable for the maximum amount of cooling demand out of the plural amounts of cooling demand makes it possible to provide optimal cooling performance for different cooling demands of various apparatuses requiring cooling that are installed within the vehicle and also to maximize the effect of reducing air resistance of the vehicle by the active air flap thus contributing to an improvement of fuel efficiency of the vehicle.

In the receiving step S10, a revolutions per minute (RPM) of an electric water pump and RPM of a radiator fan, which are requested by respective controllers for each of the apparatuses requiring cooling, may be input as the amounts of cooling demand. In this exemplary embodiment, the apparatuses requiring cooling may include the engine and the power electric (PE) components. The RPM of the electric water pump and the RPM of the radiator fan may be transmitted to the controller as the amounts of cooling demand which are required in the ECU configured to operate the engine and the MCU configured to operate the electric motors and inverters respectively, as shown in FIG. 3.

Figure 3:
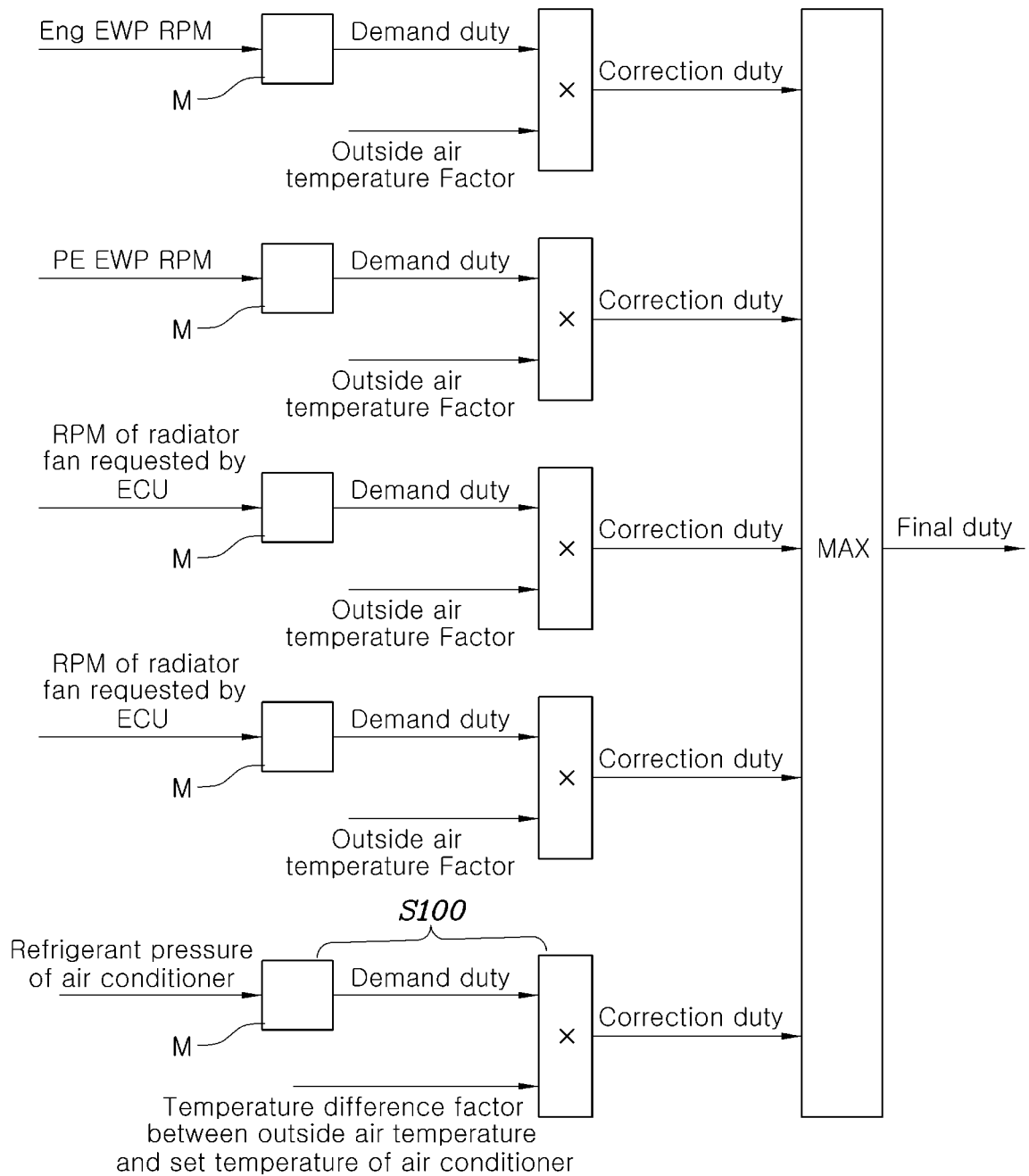
FIG. 3 is a block diagram illustrating an exemplary embodiment of the present disclosure.

In other words, as shown in FIG. 3, the RPM of the electric water pump for the engine (Eng EWP RPM) required by the ECU, the RPM of the electric water pump for the PE components (PE EWP RPM) required by the MCU, the RPM of the radiator fan required by the ECU and the RPM of the radiator fan required by the MCU may be input as the amounts of cooling demand, respectively. Notably, the electric water pump for the engine may be configured to circulate cooling water for cooling the engine and the electric water pump for the PE components may be configured to circulate cooling water for cooling the PE components.

Further, in the step S20 of calculating demand duties, a current demand duty that corresponds to the current amount of cooling demand may be calculated as the demand duty based on a map M representing demand duties that correspond to amounts of cooling demand respectively, which is provided separately for every amount of cooling demand to be calculated by requirements of the respective controllers. The map M representing demand duties that correspond to amounts of cooling demand respectively may be generated by design through experiment and analysis in advance.

For example, when the amount of cooling demand is the RPM of the electric water pump for the engine, the map M representing demand duties may include a map of duties of the active air flap that correspond to the RPMs of the electric water pump for the engine, respectively. Accordingly, when the RPM of the electric water pump for the engine, which is received in the step S10, is input, the controller may be configured to calculate the corresponding duty of the active air flap accordingly. Notably, the map representing demand duties that correspond to amounts of cooling demand respectively may be separately provided for every amount of cooling demand.

In the step S30 of calculating correction duties, the correction duties may be calculated by multiplying the demand duties by correction factors according to the outside air temperature, which are defined separately for every demand duty. In other words, even when the demand duties corresponding to the amounts of cooling demand are determined, the active air flap may not be operated merely based on the determined demand duties but may instead take the outside temperature of the vehicle into consideration.

Further, correction factors based on the outside temperatures may be set, for example, as shown in the following table (Table 1). The correction factors may be set to be the same for the respective amounts of cooling demand. For example, the correction factors may be set separately for every amount of cooling demand based on cooling characteristics of the respective apparatuses requiring cooling that are related to the outside air temperature, as described above.

TABLE 1

| | Outside Air Temperature (° C.) | | | | |
|---|---|---|---|---|---|
| | 25 | 30 | 32 | 35 | 40 |
| Correction Factor | 1 | 1.1 | 1.3 | 1.5 | 2 |

As described above, after correcting the demand duties for the amounts of cooling demand of the respective apparatuses requiring cooling to correction duties, a maximum value out of all correction duties may be selected as a final duty in the step S40 of selecting a final duty. The controller may then be configured to operate the active air flap based on the final duty.

Moreover, the exemplary embodiment shown in FIG. 3 is configured to further include considering cooling demand according to refrigerant pressure of the air conditioner. In other words, this exemplary embodiment is configured to further include considering refrigerant pressure of the air conditioner by calculating a current demand duty that corresponds to the current refrigerant pressure of the air conditioner based on a map representing demand duties that correspond to refrigerant pressures of the air conditioner respectively and then calculating correction duties by multiplying the current demand duty by temperature difference factors according to differences between the outside air temperature and a set temperature of the air conditioner, in step S100. In the step S40 of selecting a final duty, the correction duties calculated in the step S100 based on refrigerant pressure may be compared with the correction duties for the respective apparatuses requiring cooling and then a maximum value resulting from the comparison may be selected as the final duty.

What the pressure of the refrigerant of the air conditioner passing through a condenser of a cooling cycle is relatively high indicates that cooling of the refrigerant in the condenser is insufficient. Therefore, when the controller receives the pressure of the refrigerant of the air conditioner, calculates a demand duty based on the input pressure using a map representing demand duties predefined, and then calculates correction duties to be compared with the other correction duties in the step S40 of selecting a final duty by multiplying the demand duty by temperature difference factors, the active air flap may be opened to a degree that satisfies the cooling demand according to the refrigerant pressure of the air conditioner, for example, when the cooling demand according to the refrigerant pressure of the air conditioner is a greatest.

Notably, the temperature difference factors may be predefined in accordance with differences between the outside air temperature and the set temperature of the air conditioner as described above. For example, temperature difference factors may be provided as follows in Table 2:

TABLE 2

| | Outside Air Temperature − Set Temperature of Air Conditioner (° C.) | | | | |
|---|---|---|---|---|---|
| | 0 | 2 | 5 | 8 | 10 |
| Correction Factor | 0.5 | 0.8 | 1 | 1.5 | 2 |

In other words, the temperature difference factor may be set to be a greater value as the difference between the outside air temperature and the temperature of the air conditioner set by a user increases, and thus, the correction duty may be further increased. As described above, in the exemplary embodiment, since the cooling demand according to the refrigerant pressure of the air conditioner may be reflected in the operation of the active air flap to facilitate appropriate and rapid cooling of the refrigerant of the air conditioner, unnecessary operation of a compressor of the air conditioner may be reduced, thereby contributing to improvement of fuel efficiency of the vehicle.

Figure 4:
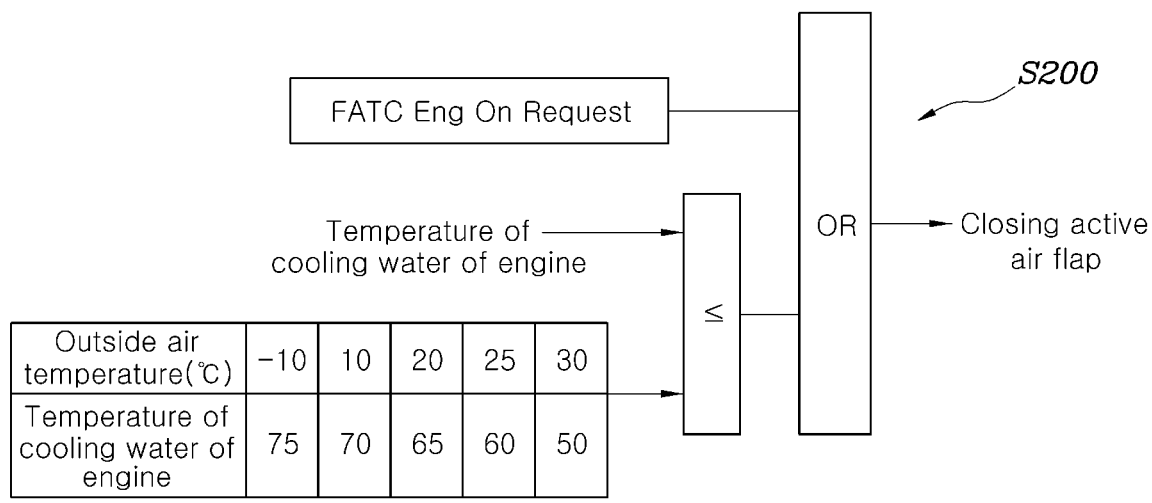
FIG. 4 is a block diagram illustrating a step of taking measures for warming an engine by closing an active air flap in an exemplary embodiment of the present disclosure.

Moreover, the present disclosure may further include warming an engine by closing the active air flap when an engine-on request is input from the FATC or temperature of cooling water of the engine is equal to or less than a reference temperature set according to the outside air temperature, in step S200. In other words, as shown in FIG. 4, when the FATC transmits a signal that indicates that the engine is required to be started to thus be heated, or when the cooling water temperature detected from an engine cooling water temperature sensor is less than a reference temperature preset according to the outside air temperature, the controller may be configured to operate the active air flap to close to thus rapidly increase the temperature of the engine.

As described above, when the temperature of the engine is rapidly increased by closing the active air flap, it may be possible to contribute to reduction of harmful components in exhaust gas by performing a more rapid warm-up of the engine, a function of exhaust gas recirculation (EGR) and the like. The reference temperature may be appropriately set in advance by experiment and analysis in consideration of the cooling water temperature at which the function of EGR as described above may be initiated.

Although the present disclosure has been described and illustrated with respect to exemplary embodiments, it will be apparent by those who have ordinary skill in the art that various modifications and changes to the present disclosure may be made without departing from the spirit and scope of the present disclosure as defined in the appended patent claims.

What is claimed is:

1. A method for controlling an active air flap of a vehicle, comprising:
   receiving, by a controller, individual amounts of cooling demand required by a plurality of apparatuses requiring cooling installed within an engine room of the vehicle;
   calculating, by the controller, demand duties based on the amounts of cooling demand required by the respective apparatuses;
   calculating, by the controller, correction duties for the respective apparatuses by multiplying the demand duties for the respective apparatuses by an outside temperature factor based on the outside temperature of the vehicle;
   selecting, by the controller, a maximum value out of the correction duties for the respective apparatuses as a final duty; and
   operating, by the controller, the active air flap to adjust an opening degree of the active air flap based on the selected final duty.

2. The method of claim 1, further comprising:
   receiving, by the controller, revolution per minute (RPM) of an electric water pump and revolution per minute (RPM) of a radiator fan, which are requested by respective controllers for each of the apparatuses, the amounts of cooling demand.

3. The method of claim 2, wherein in the calculating of demand duties, a current demand duty that corresponds to the current amount of cooling demand is calculated as the demand duty based on a map representing demand duties that correspond to amounts of cooling demand respectively.

4. The method of claim 3, wherein the map is provided separately for every amount of cooling demand to be calculated by requirements of the respective controllers.

5. The method of claim 4, wherein the calculating of correction duties further includes:
   calculating, by the controller, the correction duties by multiplying the demand duties by correction factors based on the outside air temperature,
   wherein the correction factors re defined separately for each demand duty.

6. The method of claim 1, further comprising:
   obtaining, by the controller, refrigerant pressure of an air conditioner by calculating a current demand duty that corresponds to the current refrigerant pressure of the air conditioner based on a map representing demand duties that corresponds to refrigerant pressures of the air conditioner respectively; and
   calculating, by the controller, correction duties by multiplying the current demand duty by temperature difference factors according to differences between the outside air temperature and a set temperature of the air conditioner.

7. The method of claim 6, further comprising:
   comparing, by the controller, the correction duties calculated based on refrigerant pressure the correction duties for the respective apparatuses requiring cooling; and
   selecting, by the controller, a maximum value resulting from the comparison as a final duty.

8. The method of claim 1, further comprising:
   operating, by the controller, the active air flap to close when an engine-on request is input from a full automatic temperature controller (FATC) or temperature of cooling water of the engine is equal to or less than a reference temperature set based on the outside air temperature.

9. A system for controlling an active air flap of a vehicle, comprising:
   a memory configured to store program instructions; and
   a processor configured to execute the program instructions, the program instructions when executed configured to:
      receive individual amounts of cooling demand required by a plurality of apparatuses requiring cooling installed within an engine room of the vehicle;
      calculate demand duties based on the amounts of cooling demand required by the respective apparatuses;
      calculate correction duties for the respective apparatuses by multiplying the demand duties for the respective apparatuses by an outside temperature factor based on the outside temperature of the vehicle;
      select a maximum value out of the correction duties for the respective apparatuses as a final duty; and
      operate the active air flap to adjust an opening degree of the active air flap based on the selected final duty.

10. The system of claim 9, wherein the program instructions when executed are further configured to:
    receive revolution per minute (RPM) of an electric water pump and revolution per minute (RPM) of a radiator fan, which are requested by respective controllers for each of the apparatuses, the amounts of cooling demand.

11. The system of claim 9, wherein the program instructions when executed are further configured to:
    obtain refrigerant pressure of an air conditioner by calculating a current demand duty that corresponds to the current refrigerant pressure of the air conditioner based on a map representing demand duties that corresponds to refrigerant pressures of the air conditioner respectively; and
    calculate correction duties by multiplying the current demand duty by temperature difference factors according to differences between the outside air temperature and a set temperature of the air conditioner.

12. The system of claim 11, wherein the program instructions when executed are further configured to:
    compare the correction duties calculated based on refrigerant pressure the correction duties for the respective apparatuses requiring cooling; and
    select a maximum value resulting from the comparison as a final duty.

13. The system of claim 9, wherein the program instructions when executed are further configured to:
    operate the active air flap to close when an engine-on request is input from a full automatic temperature controller (FATC) or temperature of cooling water of the engine is equal to or less than a reference temperature set based on the outside air temperature.

* * * * *